W. F. SIMONS.
FISHING LINE REEL AND HOLDER.
APPLICATION FILED JULY 8, 1909.
955,366. Patented Apr. 19, 1910.
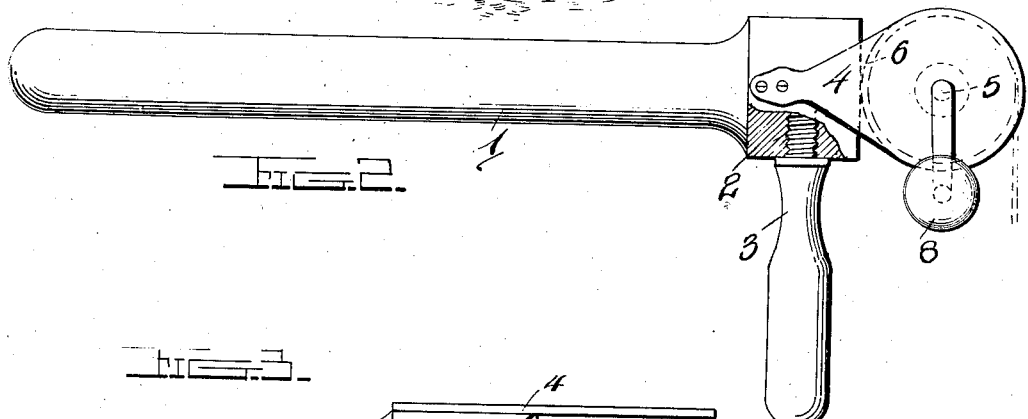
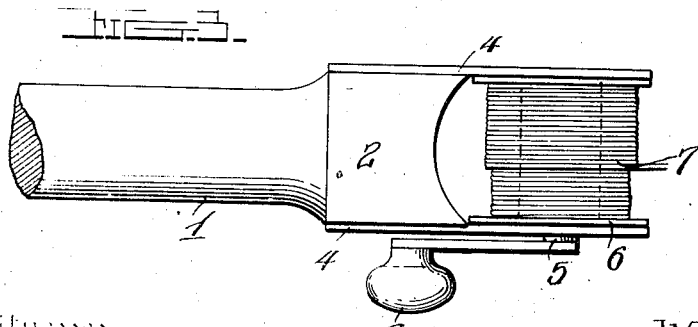
Inventor
W. F. Simons

UNITED STATES PATENT OFFICE.

WILLIAM FARR SIMONS, OF ATLANTIC CITY, NEW JERSEY, ASSIGNOR OF ONE-HALF TO JAMES L. WAREHAM, OF ATLANTIC CITY, NEW JERSEY.

FISHING-LINE REEL AND HOLDER.

955,366.  Specification of Letters Patent.  Patented Apr. 19, 1910.

Application filed July 8, 1909. Serial No. 506,559.

*To all whom it may concern:*

Be it known that I, WILLIAM FARR SIMONS, a citizen of the United States, residing at Atlantic City, in the county of Atlantic and State of New Jersey, have invented certain new and useful Improvements in Fishing-Line Reels and Holders; and I do declare the following to be a full, clear, and exact description of the invention, such as will enable others skilled in the art to which it appertains to make and use the same.

This invention relates to improvements in fishing line reels and holders.

The object of the invention is to provide a simple reel to hold and keep the line in position and means for holding the reel so that the line and fish when hooked are under perfect control at all times.

With the foregoing and other objects in view, the invention consists of certain novel features of construction, combination and arrangement of parts, as will be more fully described and particularly pointed out in the appended claim.

In the accompanying drawings, Figure 1 is a perspective view, showing the manner in which the device is used; Fig. 2 is a side view of the reel and holder; Fig. 3 is a top plan view of the same.

In the embodiment of the invention, I provide a reel holding rod or bar 1, which is preferably about two feet long or which may be of any suitable length and on the outer end of the bar is formed a squared head 2 in which is formed a threaded socket to receive the threaded shank of a handle 3 which projects downwardly at right angles to the rod or bar 1, as shown.

To the opposite sides of the head 2 is secured the inner ends of reel supporting plates 4 which project beyond the head 2 and have formed therein bearing apertures in which is revolubly mounted the shaft 5 of a spool or reel 6 on which is adapted to be wound the fishing line 7. On one end of the shaft 5 is secured a crank handle 8 by means of which the reel is turned in the proper direction to wind up the line, thus preventing the same from becoming tangled.

In using the device, the rod or bar 1 is held between the arm and body, while the handle 3 is grasped by the hand as clearly shown in Fig. 1 of the drawings. With the holder in this position, the end of the line is thrown or cast in the usual manner and when so thrown, the line will unwind from the reel or spool 6 without danger of being tangled or caught. When a fish has been hooked or it is desired to pull in the line, the handle of the reel is grasped and turned in the proper direction to wind up the line, thus keeping the same under perfect control and preventing any slack which might result in the losing of the fish.

A device of this character has many advantages over the long pole and reel now in use and is especially convenient in fishing from a boat. The length and size of the device also enables the same to be readily packed in a suit-case or valise and may thus be conveniently carried.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claim.

Having thus described my invention, what I claim is:

In a device of the class described, a reel-holding rod provided at its outer end with a head or enlargement having flat faces and an interiorly-threaded socket in its bottom face, a pair of independent bearing plates secured to opposite faces of said enlargement and having approximately circular reel supporting portions projecting therebeyond, a handle having a threaded stem adapted to screw into the socket of the head, said handle projecting downwardly at right angles from the reel supporting rod, a fishing line reel revolubly mounted between said bearing plates and a handle for the reel, the projecting portions of the bearing plates forming a protection for the reel.

In testimony whereof I have hereunto set my hand in presence of two subscribing witnesses.

WILLIAM FARR SIMONS.

Witnesses:
 LUCIUS I. WRIGHT,
 GEORGE W. BOWERS.